US012558900B2

(12) United States Patent
Tsutsumi et al.

(10) Patent No.: US 12,558,900 B2
(45) Date of Patent: Feb. 24, 2026

(54) LIQUID EJECTING APPARATUS

(71) Applicant: CANON KABUSHIKI KAISHA, Tokyo (JP)

(72) Inventors: Hiromasa Tsutsumi, Kanagawa (JP); Hideaki Matsumura, Tokyo (JP); Tsuyoshi Saeki, Kanagawa (JP); Norio Sakurai, Tokyo (JP); Daiju Takeda, Kanagawa (JP); Shota Asada, Tokyo (JP); Taiji Maruyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 18/488,813

(22) Filed: Oct. 17, 2023

(65) Prior Publication Data

US 2024/0131848 A1 Apr. 25, 2024
US 2024/0227403 A9 Jul. 11, 2024

(30) Foreign Application Priority Data

Oct. 21, 2022 (JP) ................................ 2022-169424

(51) Int. Cl.
*B41J 2/17* (2006.01)

(52) U.S. Cl.
CPC ............ *B41J 2/1721* (2013.01); *B41J 2/1735* (2024.05)

(58) Field of Classification Search
CPC ........ B41J 2/1721; B41J 2/1735; B41J 2/175; B41J 2/17509; B41J 2/185; B41J 29/02; B41J 29/13
See application file for complete search history.

(56) References Cited

U.S. PATENT DOCUMENTS

2002/0109749 A1* 8/2002 Matsumura .......... B41J 2/16523 347/36
2023/0311541 A1* 10/2023 Iwata ..................... B41J 11/007 347/31

FOREIGN PATENT DOCUMENTS

JP 3155157 B2 4/2001
JP 2002127462 A 5/2002

* cited by examiner

*Primary Examiner* — Anh T Vo

(74) *Attorney, Agent, or Firm* — Canon U.S.A., Inc. IP Division

(57) ABSTRACT

A liquid ejecting apparatus includes a liquid ejection head to eject liquid, a recovery unit, a housing, a discharge unit, a casing including the discharge unit and the housing, and a liquid receptacle. The recovery unit maintains liquid ejecting performance of the liquid ejection head. The housing houses a container that accommodates liquid received by the recovery unit. The discharge unit discharges the liquid received by the recovery unit to the container. The liquid receptacle is disposed below the discharge unit in a direction of gravity in the casing and includes a first groove extending in a first direction crossing the direction of gravity and a second groove extending in a second direction crossing the direction of gravity and the first direction.

11 Claims, 17 Drawing Sheets

LIQUID EJECTING APPARATUS

BACKGROUND

Field

The present disclosure relates to liquid ejecting apparatuses.

Description of the Related Art

Some liquid ejecting apparatuses that eject ink (liquid) for recording include a recovery portion for maintaining and recovering good ink ejecting performance. Some of such liquid ejecting apparatuses are configured to send waste ink received in the recovery portion to a waste ink tank.

Japanese Patent No. 3155157 discloses a configuration in which groove stripes are formed in the inner wall surface of the waste ink tank so that the waste ink sent to the waste ink tank is diffused in the waste ink tank, thereby increasing the absorption rate at which the waste ink is absorbed by an ink absorber.

SUMMARY

The present disclosure addresses leakage of waste ink out of a connecting portion between a waste ink tank and a liquid ejecting apparatus. Here, the present disclosure is directed to eliminate or minimize leakage of liquid into or outside a liquid ejecting apparatus.

According to an aspect of the present disclosure, a liquid ejecting apparatus includes a liquid ejection head configured to eject liquid, a recovery unit configured to maintain liquid ejecting performance of the liquid ejection head, a housing configured to house a container that is configured to accommodate liquid received by the recovery unit, a discharge unit configured to discharge the liquid received by the recovery unit to the container, a casing including the discharge unit and the housing, and a liquid receptacle disposed below the discharge unit in a direction of gravity in the casing and including a first groove extending in a first direction crossing the direction of gravity and a second groove extending in a second direction crossing the direction of gravity and the first direction.

Further features of the present disclosure will become apparent from the following description of exemplary embodiments with reference to the attached drawings.

DESCRIPTION OF THE EMBODIMENTS

First Embodiment

An embodiment of a recording apparatus will be described with reference to the accompanying drawings. It is to be understood that the following embodiment is not intended to limit the present disclosure and the not all of combinations of the characteristics described in the embodiment are absolutely necessary for the present disclosure. The positions and shapes of the components described in the embodiment are illustrative only and are not intended to limit the scope of the disclosure.

The following description is made using an ink-jet recording apparatus as a liquid ejecting apparatus including a waste ink tank according to this embodiment. The recording apparatus may be either an apparatus having only the function of recording images on recording media or a multifunctional machine having an image reading function and so on. The following description is made using a multifunctional machine capable of reading images as well as recording images on recording media as an example of the recording apparatus including a waste ink tank according to this embodiment.

Figure 1A:
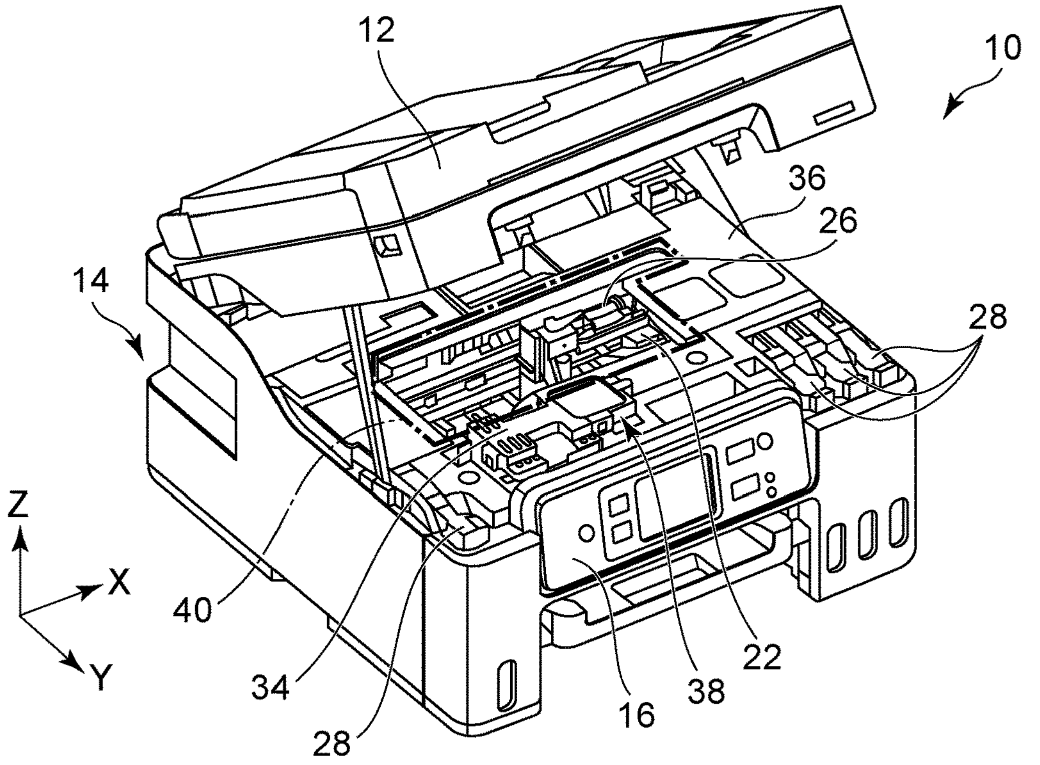
FIG. 1A is a configuration diagram of a recording apparatus according to a first embodiment of the present disclosure, with its reading portion opened.
Figure 1B:
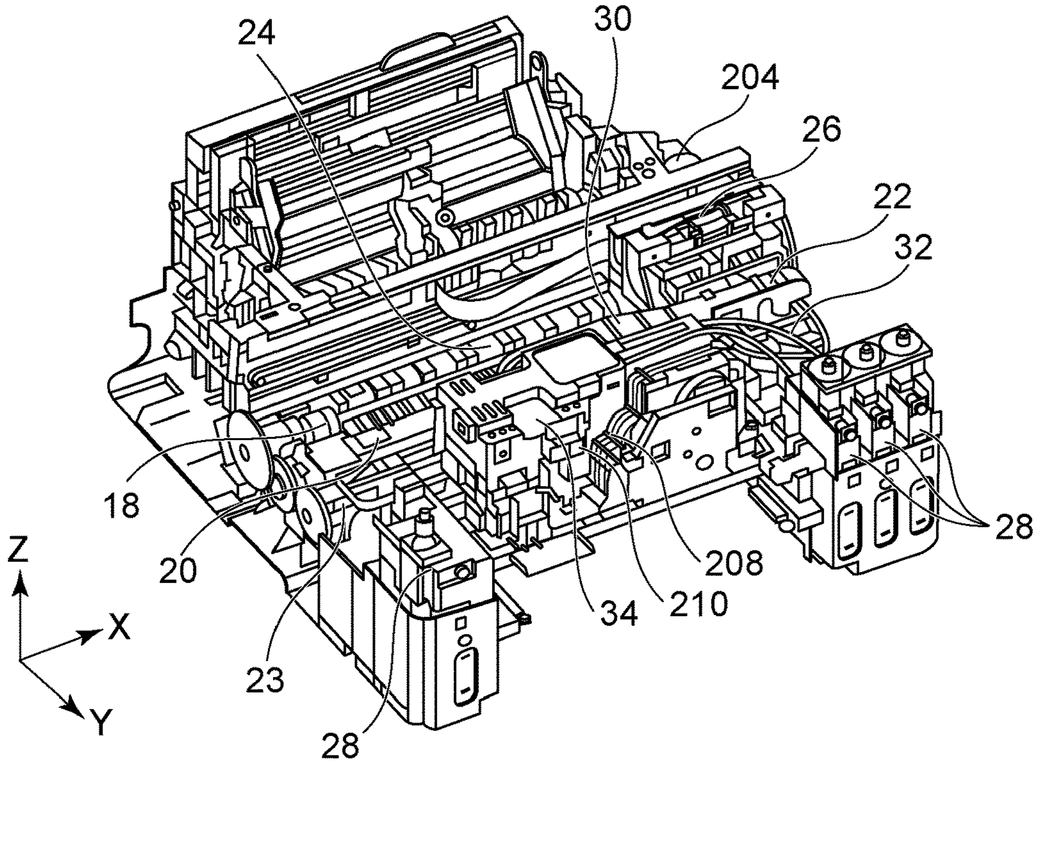
FIG. 1B is a configuration diagram of the relevant part of the recording portion.
Figure 2:
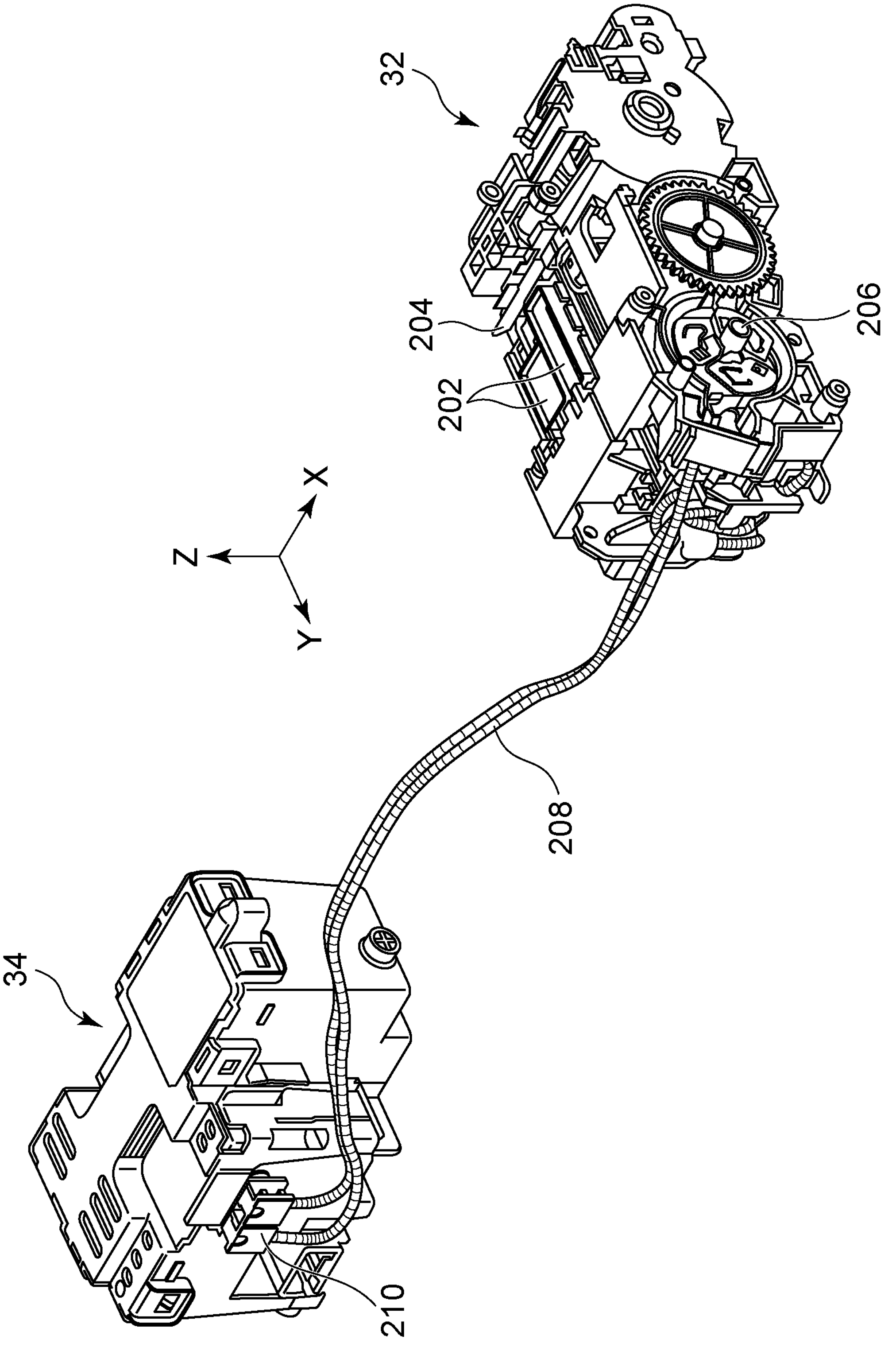
FIG. 2 is a schematic configuration diagram of a recovery portion and a waste ink tank according to the first embodiment.

FIGS. 1A and 1B are configuration diagrams of the liquid ejecting apparatus according to this embodiment. FIG. 1A is an external view of a recording apparatus 10, with its reading portion opened. FIG. 1B is a schematic configuration diagram of the relevant part of the recording portion. FIG. 2 is a schematic configuration diagram of a recovery portion and a waste ink tank.

The directions used in this specification will be described. In this specification, the direction from the left to the right of the recording apparatus 10 when an operator opposes the recording apparatus 10 is the X direction, the direction from the back to the front is the Y direction, and the direction from the bottom to the top of the apparatus is the Z direction. Thus, the X direction, the Y direction, and the Z direction are directed from one side to the other side and are given the sign "+(plus)" as appropriate. The directions from the other side to one side are given the sign "−(minus)".

The recording apparatus 10 includes a reading portion 12 configured to read original images, a recording portion 14 configured to record images on recording media based on image data, and an operating portion 16 configured to receive user instructions and to display various kinds of information. The reading portion 12 is openably and closably disposed above the recording portion 14. Since the reading portion 12 and the operating portion 16 can be formed using various known techniques, detailed descriptions thereof will be omitted.

The recording portion 14 includes a conveying roller 18 that conveys fed recording media, a platen 20 that supports the recording media conveyed by the conveying roller 18, and a recording head 22 that ejects ink to the recording media supported by the platen 20 to record. The recording portion 14 further includes a discharge roller 23 that discharges the recording media recording by the recording head 22 onto a tray (not shown).

The recording portion 14 includes a pinch roller 24 that is in pressure-contact with the conveying roller 18 and driven by the conveying roller 18 so that the recording medium can be conveyed in the ±Y direction between the conveying roller 18 and the pinch roller 24. The recording head 22 is detachably mounted on a carriage 26 that is movable in the ±X direction. Accordingly, the recording portion 14 is configured such that the recording head 22 is movable in the ±X direction via the carriage 26. The platen 20 extends in the X direction by a length corresponding to the recordable width of the recording medium.

In the recording portion 14, when a recording medium is conveyed to a recording start position with the conveying roller 18, a recording operation is performed in which the recording head 22 moves in the X direction (or the −X direction) while ejecting ink onto the recording medium to record. Next, a conveying operation is performed in which the recording medium is conveyed by a predetermined amount in the Y direction by the conveying roller 18 to position an unrecorded area at a position facing the recording head 22, and the recording operation is performed again. Thus, alternately repeating the recording operation and the conveying operation allows the recording portion 14 to record on the recording medium.

The recording portion 14 includes ink tanks 28 that reserve the ink to be supplied to the recording head 22 on the other side in the Y direction. The ink tanks 28 are connected to the recording head 22 via tubes 30, so that the ink reserved in the ink tanks 28 are supplied to the recording head 22 through the tubes 30. The recording portion 14 further includes a recovery portion 32, at a position facing the recording head 22 at a standby position, that executes a recovery operation for maintaining and recovering the good ink ejecting performance of the recording head 22. The standby position is a position where the recording head 22 waits during a non-recording period, for example, a position near the other end in the X direction of the moving region of the recording head 22 including the carriage 26 (hereinafter simply referred to as "the moving region of the recording head 22" or "the moving region of a recording unit U (described later)". The recording portion 14 further includes a waste ink tank 34 to which the waste ink received at the recovery portion 32 is discharged.

The recovery portion 32 includes caps 202 that cap to protect an ejection port surface including ejection ports for ejecting the ink in the recording head 22, a wiper 204 that wiping out extraneous matter attached to the ejection port surface, and a suction pump 206 that reduces the pressure in the caps 202 (see FIG. 2). Since this embodiment is configured to eject black ink and color ink, the caps 202 include a cap corresponding to ejection ports for black ink and a cap corresponding to ejection ports for color ink.

The suction pump 206 is connected to discharge tubes 208. The discharge tubes 208 are connected to the suction pump 206 at one end and connected to the waste ink tank 34 at the other end via connecting portions 210. In other words, the recovery portion 32 is connected to the waste ink tank 34 via the discharge tubes 208. In the recording portion 14, the waste ink received at the recovery portion 32 by executing various recovery operations is discharged to the waste ink tank 34 through the discharge tubes 208. The connecting portions 210 each include a needle 950 (see FIG. 8). Inserting the needle 950 into an insertion port 408 (see FIG. 6, described later) of the waste ink tank 34 causes the discharge tube 208 to be connected to the waste ink tank 34. In this embodiment, the discharge tube 208 is made of a flexible member.

The upper surface of the recording portion 14 is formed of a cover 36 (see FIG. 1A). Accordingly, the recording apparatus 10 is configured such that the cover 36 is exposed to the outside when the reading portion 12 is opened. The cover 36 includes an opening 40 through which part of the moving region of the recording head 22 and a housing 38 for the waste ink tank 34 are exposed. A portion of the opening 40 exposing part of the moving region of the recording head 22 has a size that allows the user, for example, when a paper jam occurs, to put the hand into the moving region of the recording head 22 to remove the jammed recording medium. A portion of the opening 40 exposing the housing 38 has a size that allows the waste ink tank 34 to be inserted into the housing 38 in the −Z direction (the direction of gravity). The housing 38 is positioned on the other side in the Y direction of the moving region of the recording head 22 and on one side in the X direction of the moving region. For this reason, in the recording apparatus 10, when the reading portion 12 is opened, the waste ink tank 34 is positioned closer to the viewer than the moving region of the recording head 22, which makes it easy for the user or an operator such as a person who is in charge of repairs to replace the waste ink tank 34.

Figure 3:
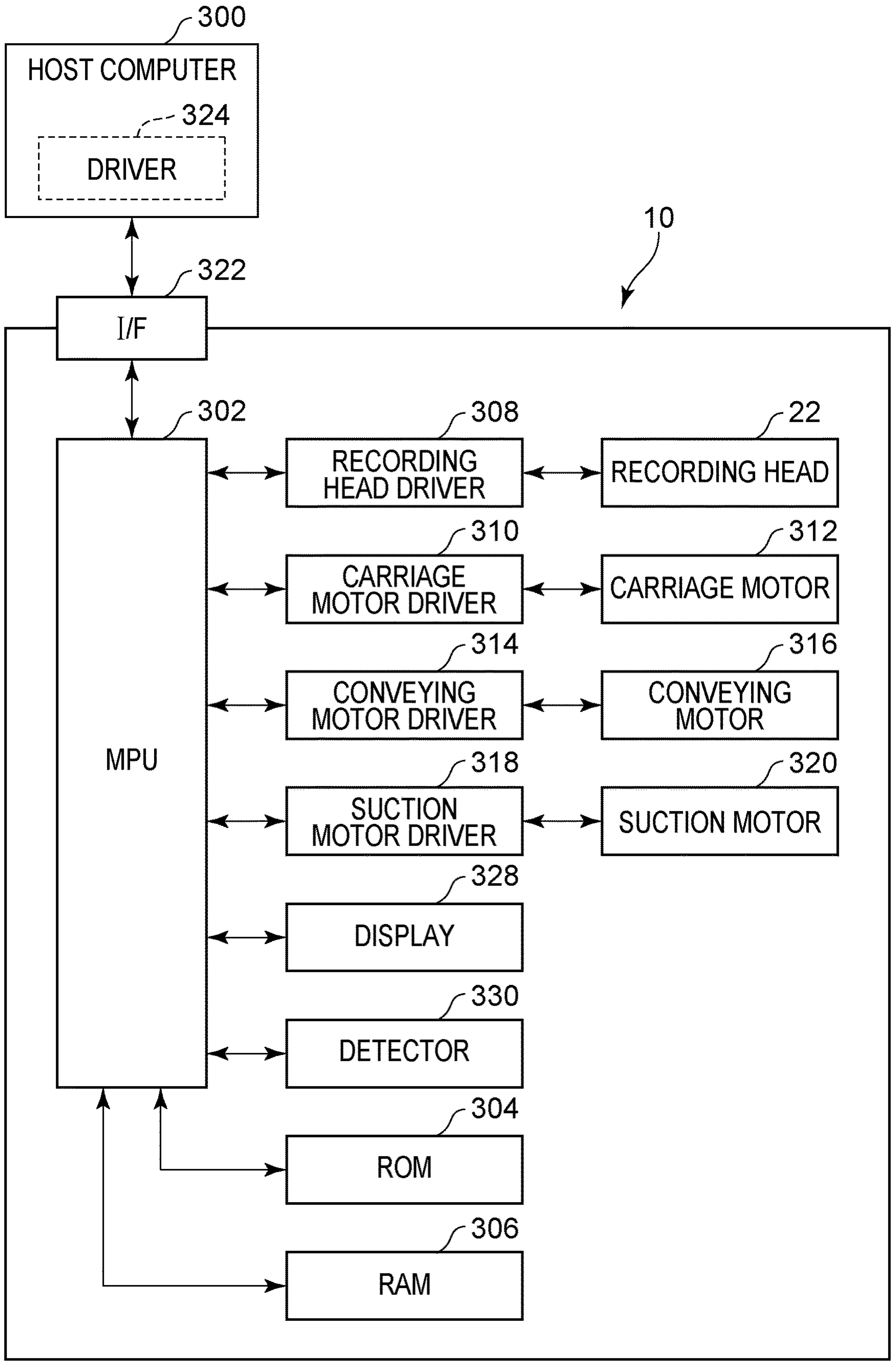
FIG. 3 is a block diagram illustrating the configuration of the control system of the recording apparatus according to the first embodiment.

FIG. 3 is a block diagram illustrating the configuration of the control system of the recording apparatus 10. FIG. 3 illustrates the main configuration of the recording portion 14 of the recording apparatus 10.

The recording apparatus 10 includes a micro-processing unit (MPU) 302 that controls the operation of the entire recording apparatus 10, such as the operations of the components and data processing, and a read-only memory (ROM) 304 that stores various programs executed by the MPU 302 and various kinds of data. The recording apparatus 10 further includes a random-access memory (RAM) 306 that temporarily stores process data executed by the MPU 302 and data received from a host computer 300 (described later).

The MPU 302 is connected to a recording head driver 308 and controls the driving of the recording head 22 via the recording head driver 308. The MPU 302 is connected to a carriage motor driver 310 and controls the driving of a carriage motor 312 for moving the carriage 26 via the carriage motor driver 310. The MPU 302 is also connected to a conveying motor driver 314 and controls the driving of a conveying motor 316 that drives the conveying roller 18 and the discharge roller 23 via the conveying motor driver 314. The MPU 302 is also connected to a suction motor driver 318 and controls a suction motor 320 that drives the suction pump 206 via the suction motor driver 318.

The MPU 302 is connected to an interface (UF) 322 and is connected to the host computer 300 via the I/F 322. The host computer 300 includes a driver 324 for collecting record information such as a record image and record quality and for communicating with the recording apparatus 10 in response to an instruction to start recording from the user. The MPU 302 is also connected to a display 328 and controls display at the operating portion 16 via the display 328. The MPU 302 is also connected to a detector 330 capable of detecting the amount of waste ink discharged to the waste ink tank 34. The MPU 302 issues a notification that, for example, prompts replacement of the waste ink tank 34 via the display 328 based on the detection result of the detector 330.

Figure 4:
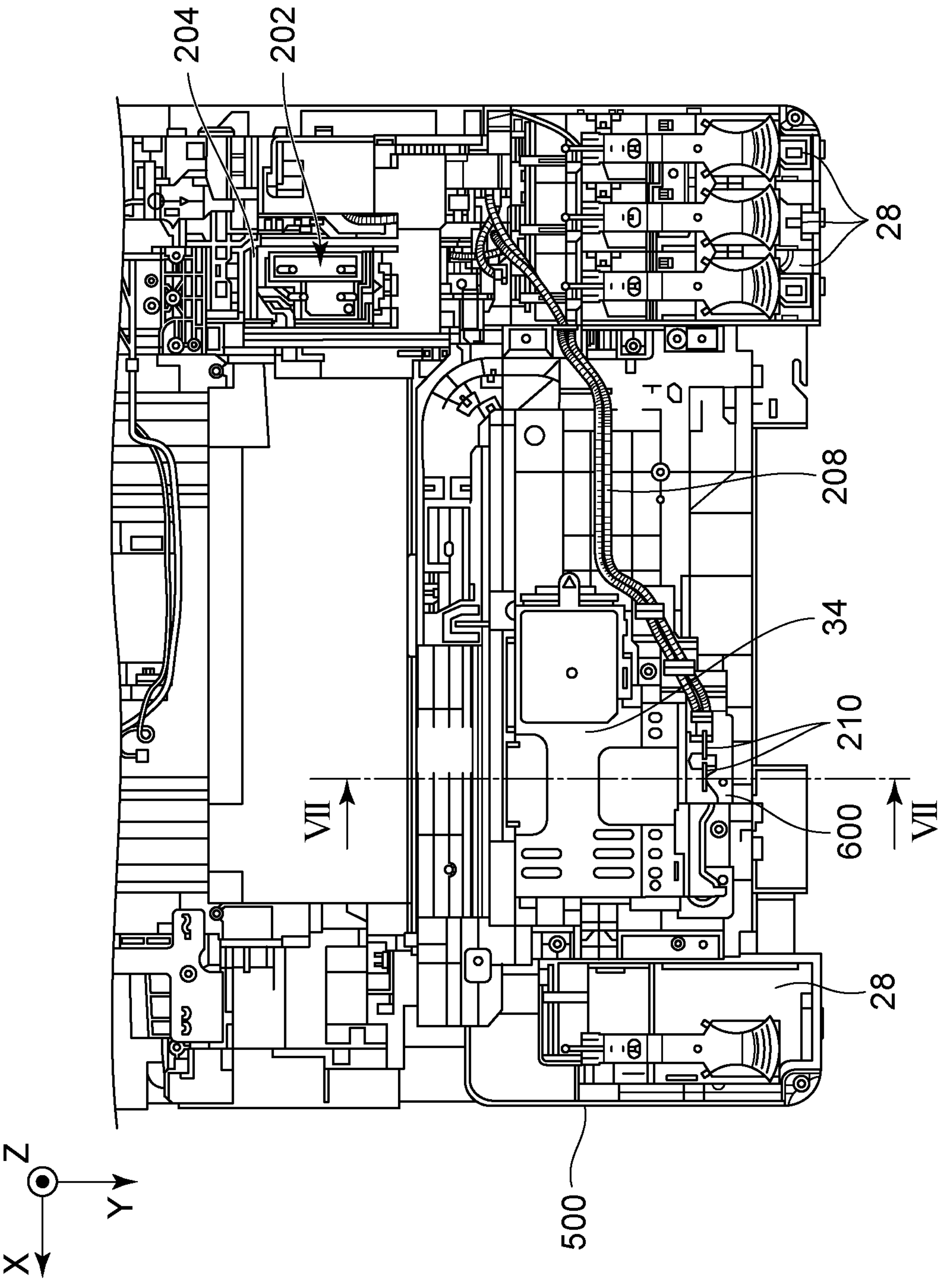
FIG. 4 is a schematic diagram illustrating the internal configuration of the recording apparatus having the waste ink tank mounted therein in the first embodiment.
Figure 5:
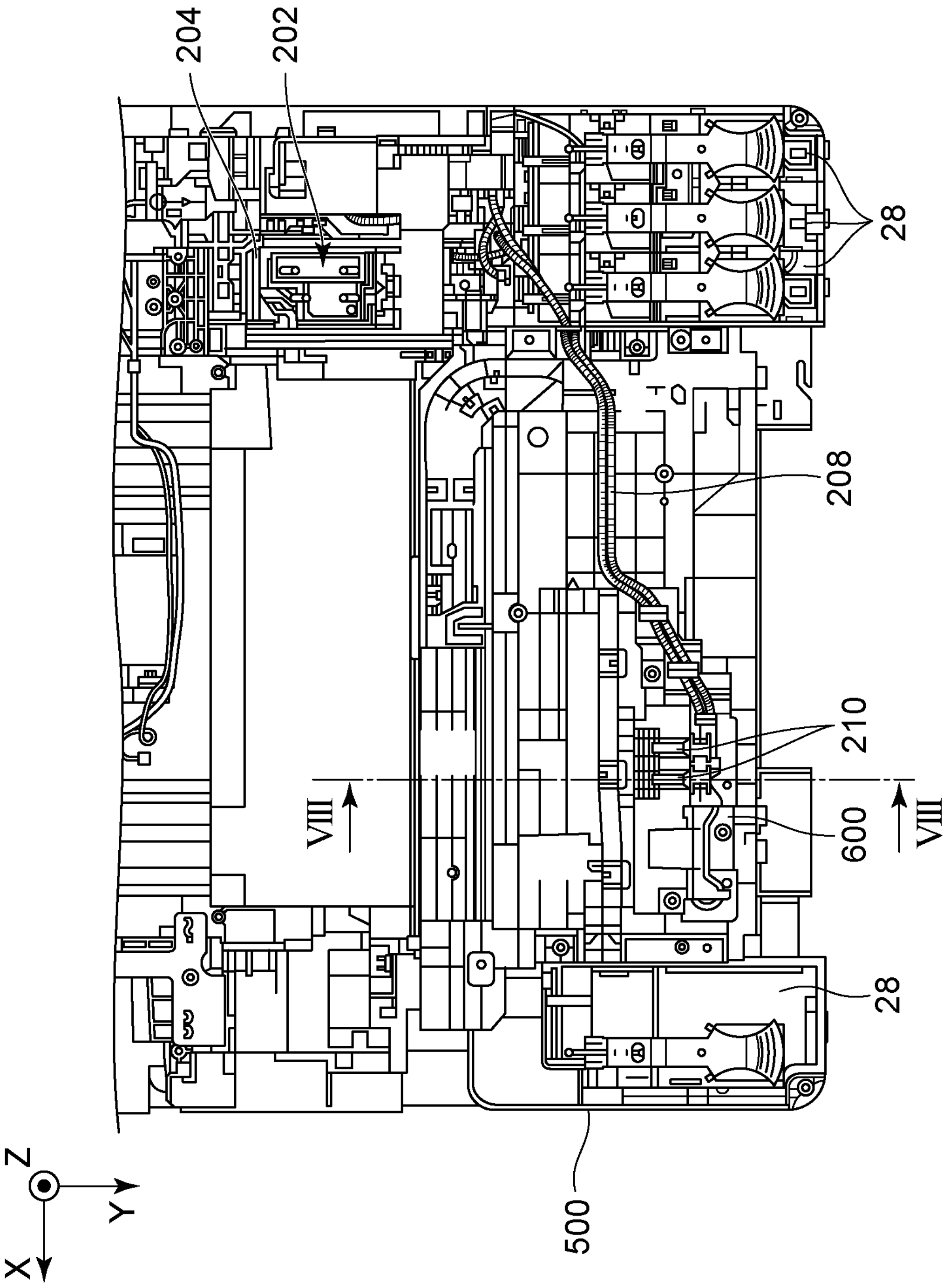
FIG. 5 is a schematic diagram illustrating the internal configuration of the recording apparatus having the waste ink tank not mounted therein in the first embodiment.

FIGS. 4 and 5 are schematic diagrams illustrating the internal configuration of the recording apparatus 10. FIG. 4 illustrates the recording apparatus 10 having the waste ink tank 34 mounted therein, and FIG. 5 illustrates the recording apparatus 10 having the waste ink tank 34 not mounted therein. In this embodiment, the waste ink tank 34 is attached to the connecting portions 210 provided at the front in the Y direction in the recording apparatus 10. The connecting portions 210 are disposed at a holder member 600 fixed to a casing 500 constituting the outer surface of the recording apparatus 10. The position of the waste ink tank 34 in the recording apparatus 10 is fixed by attaching the waste ink tank 34 to the connecting portions 210. The holder member 600 holds, in addition to the connecting portions 210, an attachment/detachment detector 700 for the discharge tubes 208 and the waste ink tank 34 and an electrical wiring line 701 (see FIG. 11).

Figure 6:
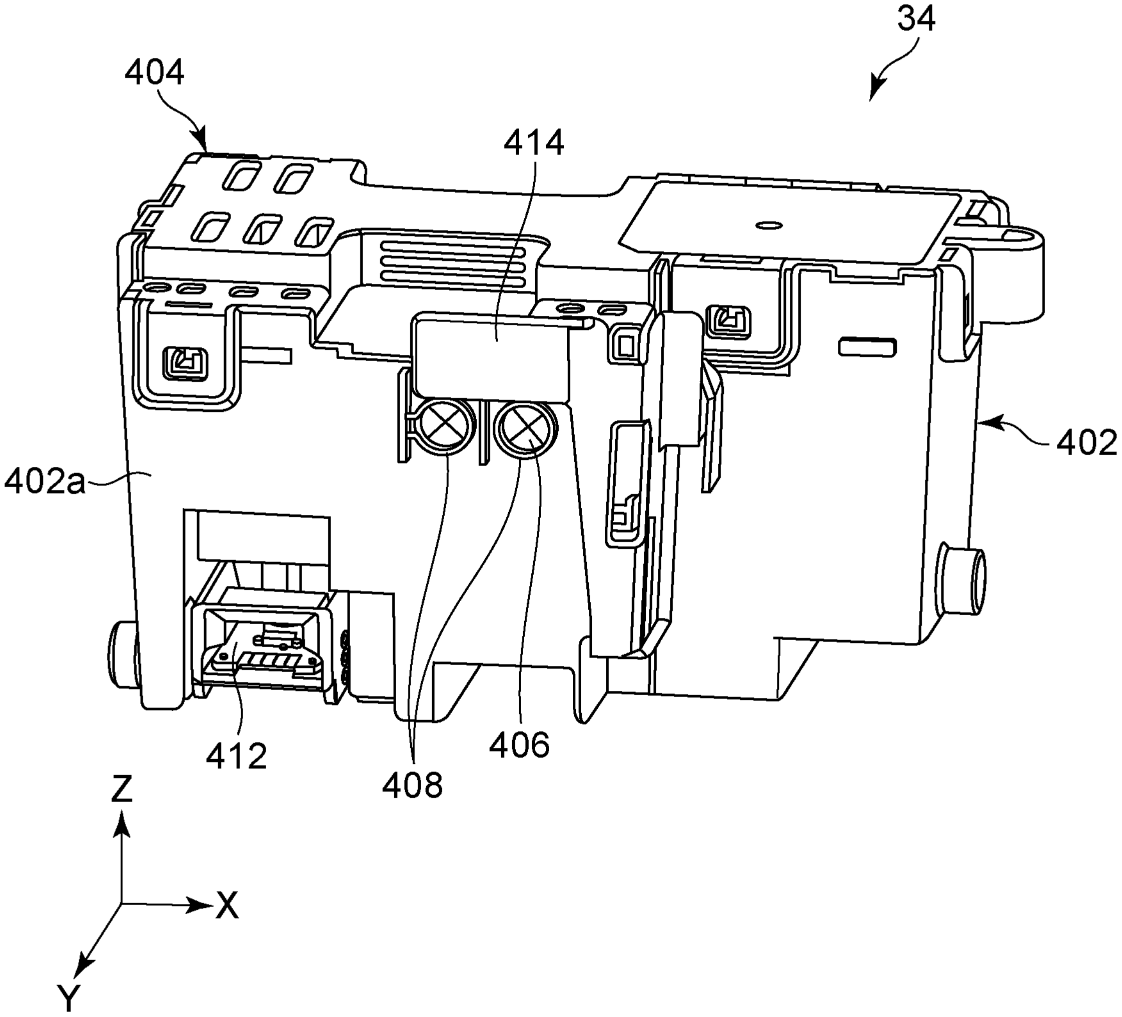
FIG. 6 is a perspective configuration diagram of the waste ink tank according to the first embodiment.

FIG. 6 is a perspective configuration diagram of the waste ink tank 34. The X direction, the Y direction, and the Z direction in the diagram indicate the directions when the waste ink tank 34 is housed in the housing 38. The waste ink tank 34 is replaced with a new waste ink tank 34 by an operator based on, for example, a notification, displayed on an operating portion 16, that prompts replacement of the waste ink tank 34.

The waste ink tank 34 includes a substantially box-shaped container 402 (see FIG. 6) with an opening at the top and a cover 404 detachably fixed to the container 402 so as to cover the opening at the top of the container 402. The waste ink tank 34 includes absorbers 406 housed in the container 402 and capable of absorbing waste ink.

The container 402 includes insertion ports 408, at a side 402*a* on the other side in the Y direction when the waste ink tank 34 is housed in the housing 38, that are open so that a needle 950 (see FIG. 7) provided at each connecting portion 210 can be inserted or extracted. The absorbers 406 housed in the container 402 are exposed from the openings of the insertion ports 408. In this embodiment, two insertion ports 408 are provided in the X direction. The needle 950 for discharging black waste ink is inserted in one insertion port 408, and the needle 950 for discharging color waste ink is inserted in the other insertion port 408.

In housing the waste ink tank 34 in the housing 38, first, the waste ink tank 34 is inserted in the −Z direction from a position of the opening 40 corresponding to the housing 38. Thereafter, the waste ink tank 34 is moved in the Y direction to insert the needles 950 into the insertion ports 408. In other words, in this embodiment, when the waste ink tank 34 is housed in the housing 38, the needles 950 in the connecting portions 210 are inserted into the insertion ports 408. Waste ink is discharged from the needles 950 into the container 402 through the discharge tubes 208, and the discharged waste ink is absorbed into the absorbers 406. Thus, in this embodiment, the needles 950 function as discharge member for discharging waste ink to the waste ink tank 34.

The container 402 has, on a side 402*a*, a connecting terminal 412 configured to, when the waste ink tank 34 is housed in the housing 38, be electrically connected to an attachment/detachment detector 700 (see FIG. 11) provided at the holder member 600 of the housing 38. The connecting terminal 412 is disposed at one end in the Z direction with respect to the insertion ports 408 and at a different position in the X direction from the insertion ports 408. For this reason, even if waste ink leaks from the insertion ports 408, the leaked waste ink hardly reaches the connecting terminal 412. The MPU 302 detects the waste ink tank 34 being housed in the housing 38 by detecting the attachment/detachment detector 700 being connected to the connecting terminal 412 on the housing 38 based on the result of detection by the detector 330. The MPU 302 detects the waste ink tank 34 being removed from the housing 38 by detecting the connection between the connecting terminal of the housing 38 and the connecting terminal 412 being released based on the result of detection by the detector 330. When the MPU 302 detects a new waste ink tank 34 being housed in the housing 38, the MPU 302 initializes the stored amount of waste ink discharged to the waste ink tank 34.

The container 402 includes, on the side 402*a*, a shield 414 configured to close and open the insertion ports 408. The shield 414 is movable between a closed position and an open position. The shield 414 shields the insertion port 408 from the outside by being positioned at a shield position where the insertion ports 408 are shielded. This allows the absorbers 406 exposed from the insertion ports 408 to be shielded from the outside. The shield 414 exposes the insertion ports 408 by being positioned at an open position where the insertion ports 408 are opened. This allows the absorbers 406 to be exposed to the outside from the insertion ports 408. To mount the waste ink tank 34 on the connecting portions 210, first, the waste ink tank 34 is inserted in the −Z direction into the recording apparatus 10 from above the opening 40 of the recording portion 14 (see FIG. 1A). Thereafter, the waste ink tank 34 is moved in the Y direction to insert the needles 950 into the insertion ports 408. In other words, in this embodiment, when the waste ink tank 34 is housed in the housing 38, the needles 950 of the connecting portions 210 are inserted into the insertion ports 408. The waste ink is discharged from the needles 950 into the container 402 through the discharge tubes 208, and the discharged waste ink is absorbed by the absorbers 406. Thus, in this embodiment, the needles 950 function as a discharge member for discharging waste ink to the waste ink tank 34.

Figure 7:
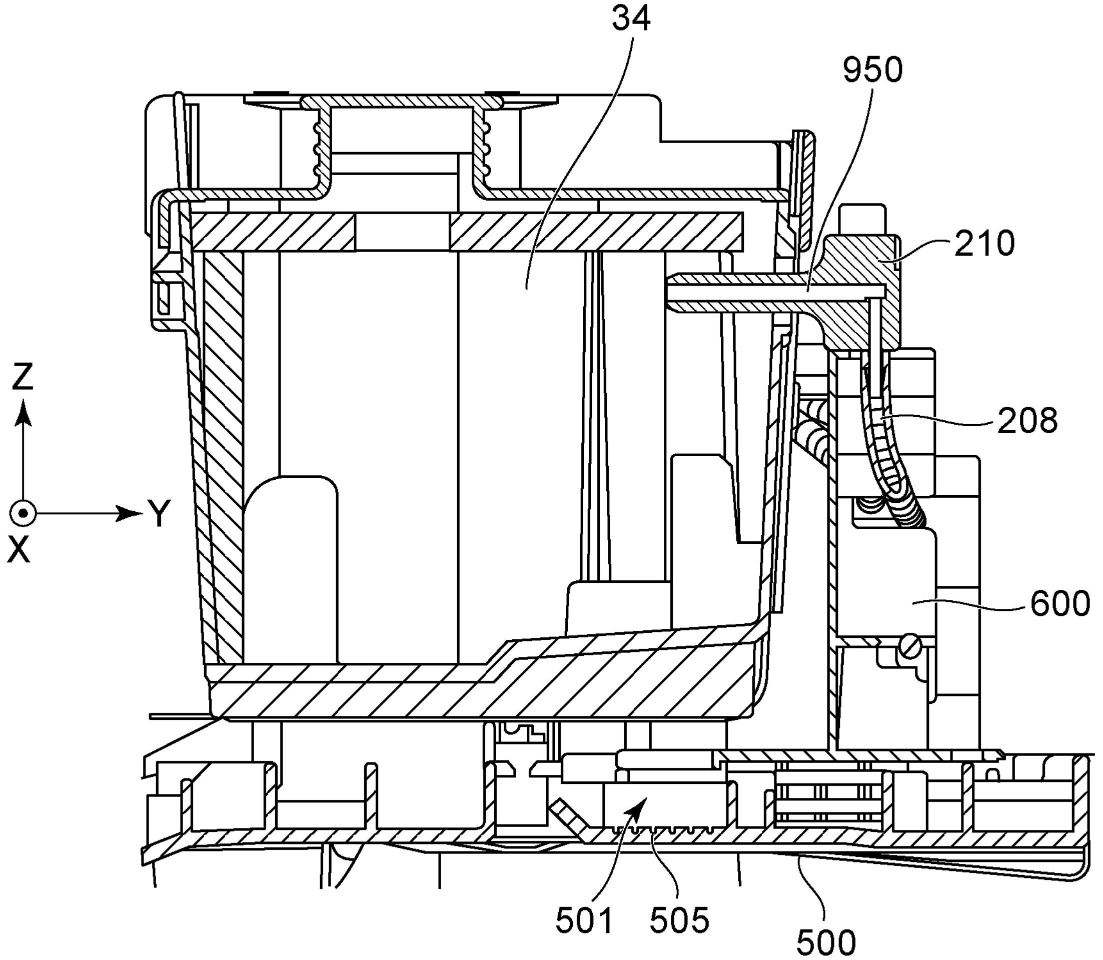
FIG. 7 is a cross-sectional view of the casing and the waste ink tank of the recording apparatus according to the first embodiment taken along line VH-VH in FIG. 4 viewed from the X direction.
Figure 8:
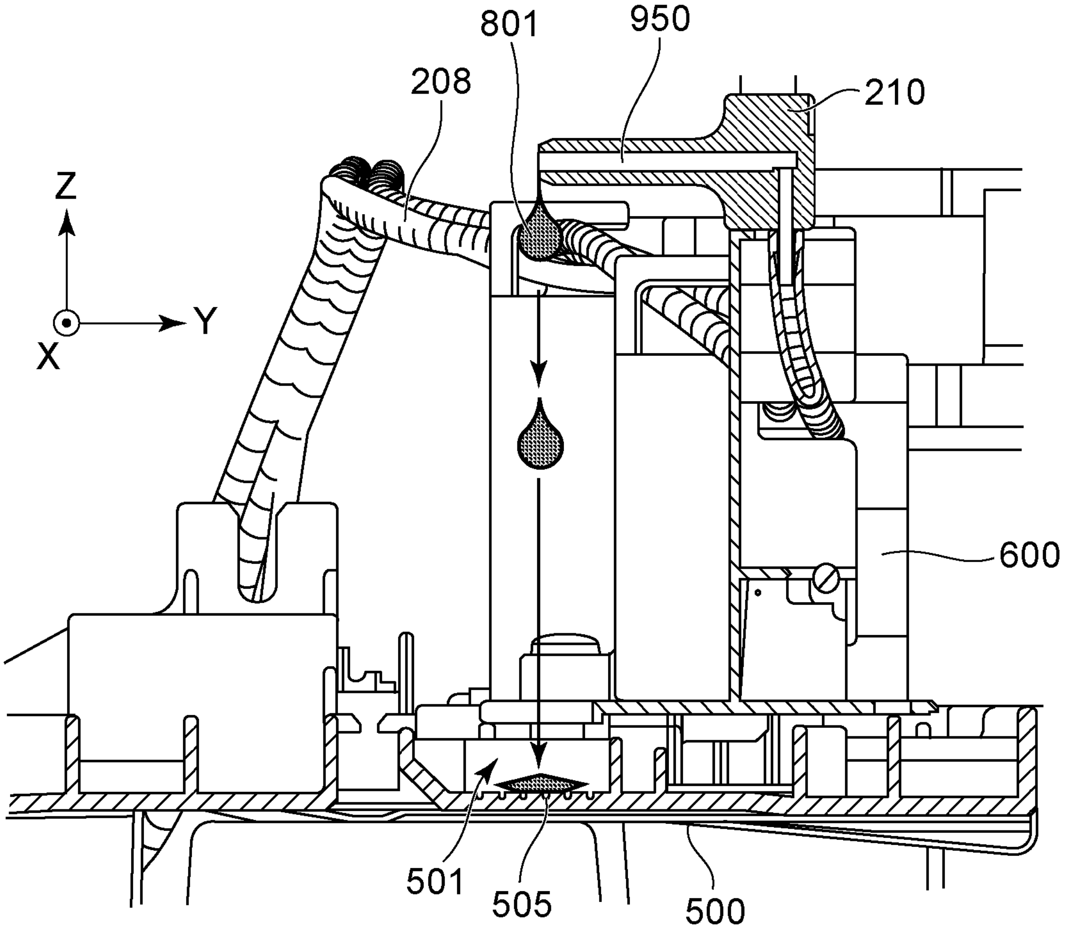
FIG. 8 is a cross-sectional view of the casing and the waste ink tank of the recording apparatus according to the first embodiment taken along line VIII-VIII in FIG. 5 viewed from the X direction.
Figure 9:
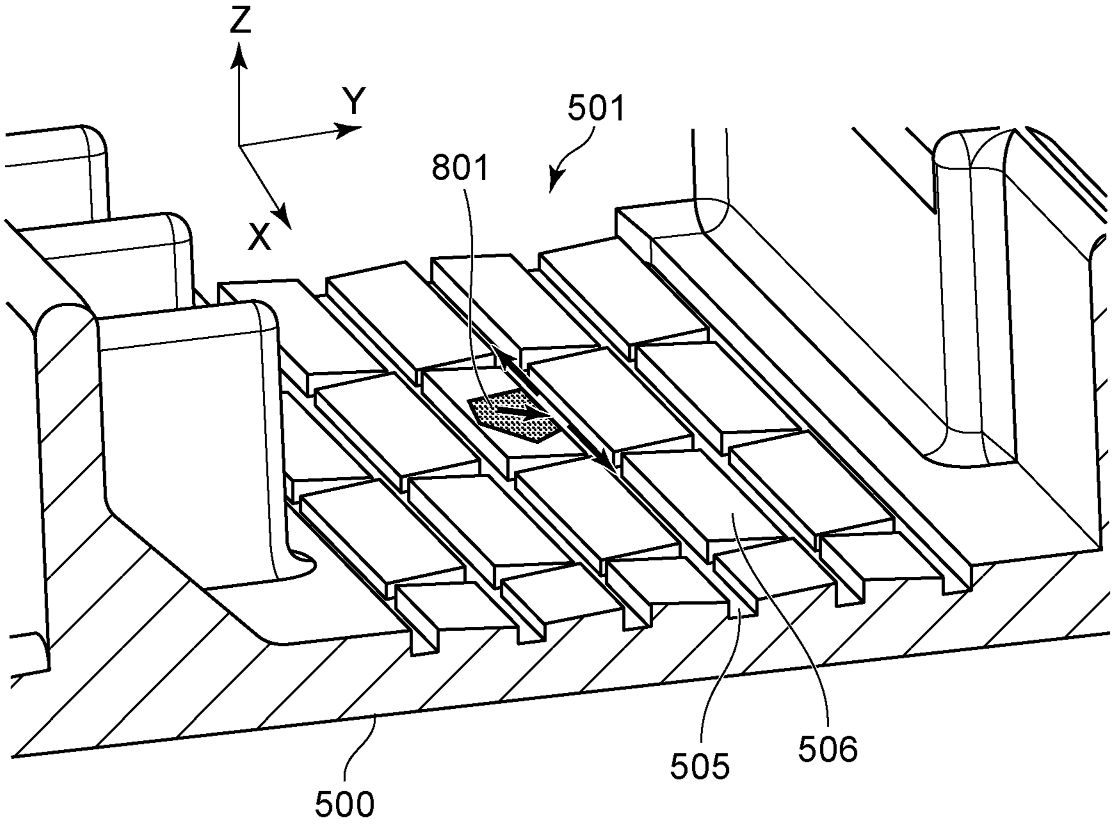
FIG. 9 is an enlarged perspective view of an ink receptacle in the first embodiment.

FIG. 7 is a cross-sectional view of the casing 500 and the waste ink tank 34 taken along line VII-VII in FIG. 4 viewed from the X direction. FIG. 8 is a cross-sectional view of the casing 500 taken along line VIII-VIII in FIG. 5 viewed from the X direction. FIG. 9 is an enlarged perspective view of an ink receptacle 501 of the casing 500. In this embodiment, the ink receptacle 501 is disposed at a position of the casing 500 located in the −Z direction with respect to the needles 950, and the ink receptacle 501 has grooves 505 on the bottom, that is, a surface in the −Z direction. The waste ink tank 34 is configured to be attached to and detached from the housing 38, as described above, and the waste ink may drop into the casing 500 from the insertion ports 408 or the needles 950 during the attachment or detachment. Furthermore, the configuration in which waste ink is discharged from the needles 950 into the waste ink tank 34 can cause, when the waste ink tank 34 is not housed in the housing 38, the waste ink to drop from the needles 950 exposed into the casing 500. The waste ink that has dropped from the needles 950 drops from the ends of the needles 950 onto the ink receptacle 501.

The ink receptacle 501 of this embodiment has the grooves 505 at the bottom in the form of a grid, as shown in FIG. 9, and has protrusions 506 adjacent to the grooves 505. The upper surfaces of the protrusions 506 are inclined in the Z direction toward the grooves 505. The waste ink that has dropped from the needles 950 onto the ink receptacle 501 is hereinafter referred to as ink droplets 801. The motion of an ink droplet 801 that has dropped onto the upper surface of one protrusion 506 will be described. The ink droplet 801 that has dropped from the needle 950 first comes into contact with the protrusion 506 and moves in the direction of the arrow in FIG. 9 without staying on the upper surface of the protrusion 506 because of the inclination and is immediately guided to the grooves 505. The ink droplet 801 that has flowed into the grooves 505 diffuses along the shape of the grooves 505.

In this embodiment, the protrusions 506 are configured such that the directions of the inclinations of the upper surfaces thereof are alternate. This allows the waste ink to be evenly diffused into the grooves 505 even when the ink droplet 801 drops across a plurality of protrusions 506 such as when the amount of the ink droplet 801 is large. The waste ink guided to the grooves 505 and diffused is retained by a capillary force, which eliminates or minimizes splashing of the waste ink out of the ink receptacle 501 and leakage out of the recording apparatus 10 even when the orientation of the recording apparatus 10 changes such as when the apparatus is transported. The dimensions of each groove 505 may be suitably set in accordance with the size of the casing 500, the sizes of the components, the viscosity of the ink, and so on. One example is 0.5 to 1.5 mm in width and 0.5 to 1.5 mm in depth.

The waste ink that has been diffused by the grooves 505 has a larger surface area than waste ink that stays in the casing 500 in the state of a droplet without diffusing, which increases the ink evaporation rate. This allows the ink droplet 801 to be immediately diffused and evaporated, which allows reducing the amount of waste ink diffused into the grooves 505 by evaporation, in addition to holding the waste ink using the capillary force of the grooves 505. This further eliminates or minimizes splashing of the waste ink out of the ink receptacle 501 and leakage out of the recording apparatus 10. The protrusions 506 provide similar advantages even with such a shape that not the entire upper surface is inclined, but part is flat and the other part is inclined downward toward the grooves 505.

Figure 10:
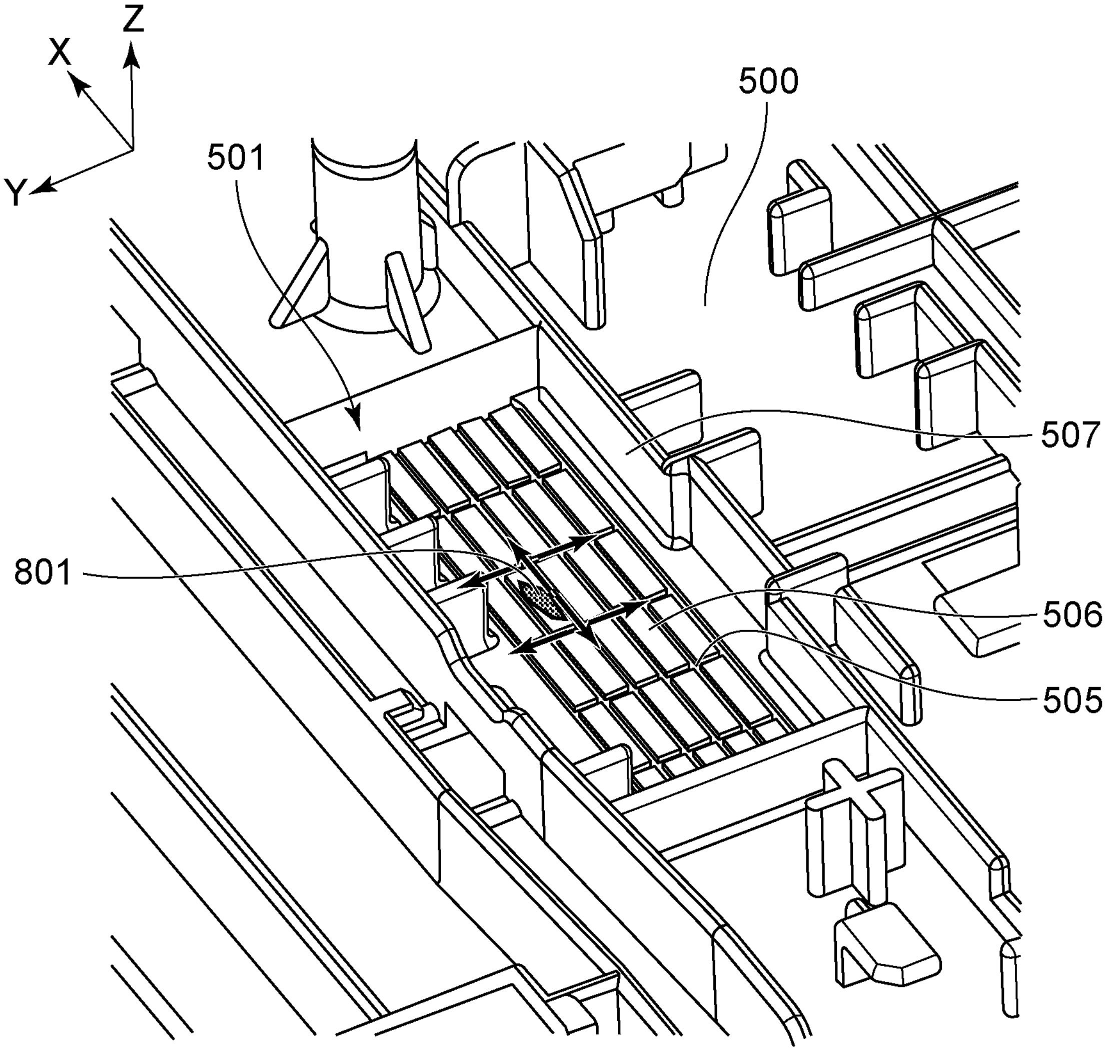
FIG. 10 is an external perspective view of the ink receptacle in the first embodiment.

FIG. 10 is an external perspective view of the ink receptacle 501. The ink droplet 801 that has leaked from the needle 950 or the insertion port 408 and dropped onto the ink receptacle 501 is retained in the grooves 505, which eliminates or minimizes splashing and leakage in the recording apparatus 10. However, if the amount of leaked waste ink exceeds the capacity of the grooves 505, waste ink that cannot be retained flows in the ink receptacle 501. In this embodiment, the ink receptacle 501 is shaped like a tub with a height in the Z direction and enclosing the grooves 505 and the protrusions 506 with a wall 507. This allows, even when waste ink of an amount that cannot be retained in grooves 505 is in the ink receptacle 501, the motion of the flowing waste ink in the X-Y direction to be restricted by the wall 507, so that the waste ink remains in the ink receptacle 501 without leaking out of the ink receptacle 501. The wall 507 may be higher than the highest upper surface of the protrusions 506. The wall 507 does not need to enclose the four sides of the ink receptacle 501 in the X-Y plane but may be provided on one side or may be U-shaped. Alternatively, a plurality of noncontinuous walls may be provided to restrict the motion of waste ink in a predetermined direction.

Figure 11:
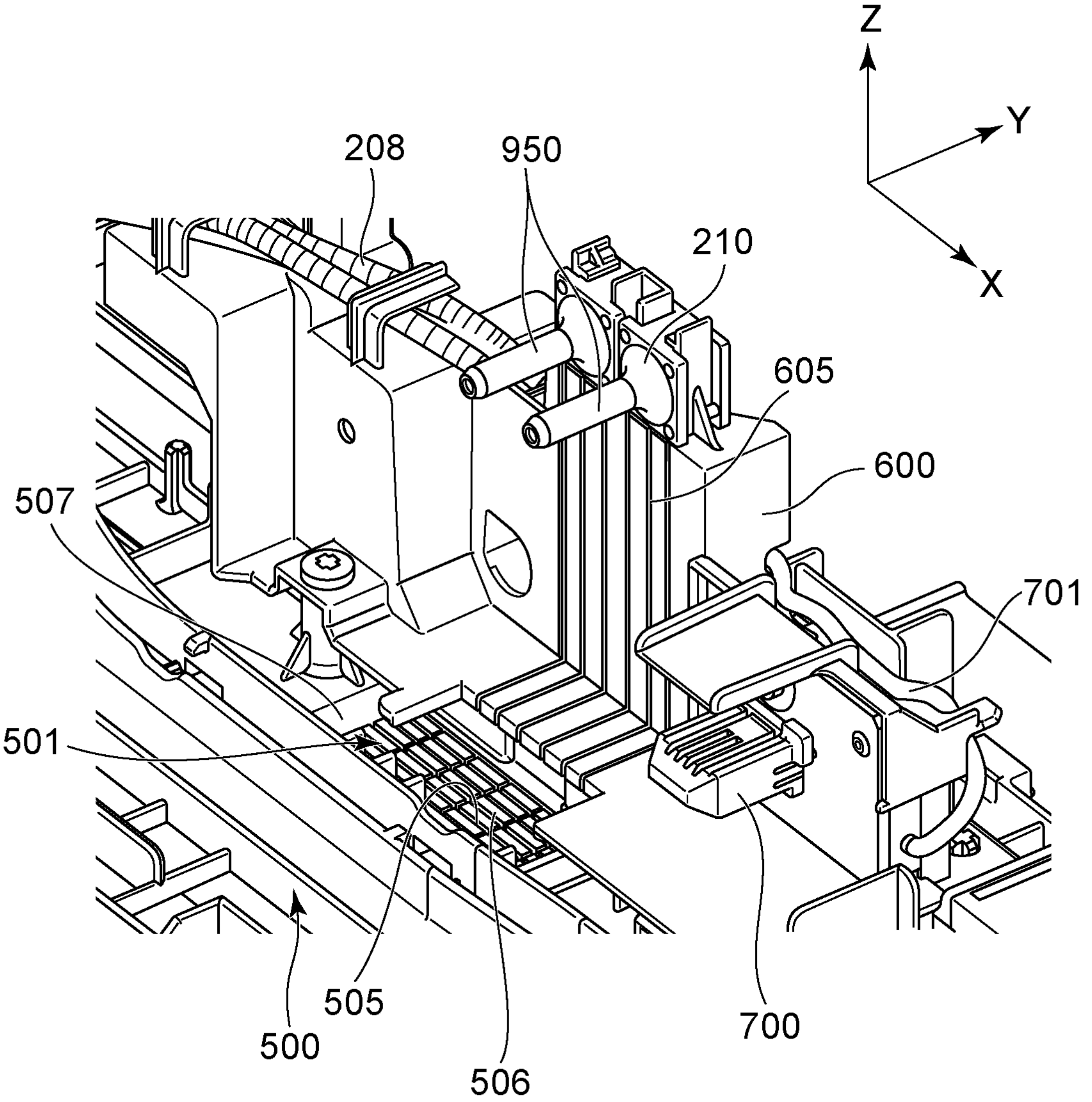
FIG. 11 is a perspective view of the ink receptacle and the connecting portions in the first embodiment illustrating the peripheral configuration thereof.

FIG. 11 is a perspective view of the ink receptacle 501 and the connecting portions 210 illustrating the peripheral configuration thereof. In this embodiment, the attachment/detachment detector 700 for connecting the connecting terminal 412 of the waste ink tank 34 and the needles 950 differs in position in the X direction, similar to the positional relationship between the connecting terminal 412 and the insertion port 408 of the waste ink tank 34. However, since the attachment/detachment detector 700 is disposed below the needles 950 in the Z direction, the waste ink that has leaked from the needles 950, if it falls along the connecting portions 210 or the holder member 600, can adhere to the attachment/detachment detector 700. For this reason, this embodiment is configured such that the holder member 600 has grooves 605 to guide the waste ink that has moved from the needles 950 to the holder member 600 along the connecting portions 210 to the ink receptacle 501. The grooves 605 are disposed so as to connect the connecting portions 210 and the ink receptacle 501 together, so that the waste ink flows into the grooves 605 and is guided downward in the direction of gravity along the grooves 605, which eliminates or minimizes the amount of waste ink that reaches the attachment/detachment detector 700. The grooves 605 are disposed apart from the attachment/detachment detector 700, and in this embodiment, apart in the X direction. This can eliminate or minimize attaching of waste ink that has moved from the needles 950 to the connecting portions 210 to the attachment/detachment detector 700 or the electrical wiring line 701. Not only the holder member 600 but also the side wall, the bottom surface, or the upper surface of the waste ink tank 34 may have grooves to guide the waste ink to the ink receptacle 501.

With the above configuration, even if waste ink leaks from the waste ink tank 34 or the connecting portions 210, the leaked waste ink can be retained in the ink receptacle 501. This can eliminate or minimize splashing of the waste ink in the recording apparatus 10 to contaminate other components or leakage of the waste ink out of the recording apparatus 10. Since the waste ink can be efficiently diffused in the ink receptacle 501 by the protrusions 506 and the grooves 505, there is no need to have an ink absorber or the like, which can reduce the size of the recording apparatus.

Other Embodiments

Other embodiments of the present disclosure will be described. Descriptions of the same as the configurations of the first embodiment will be omitted.

Figure 12:
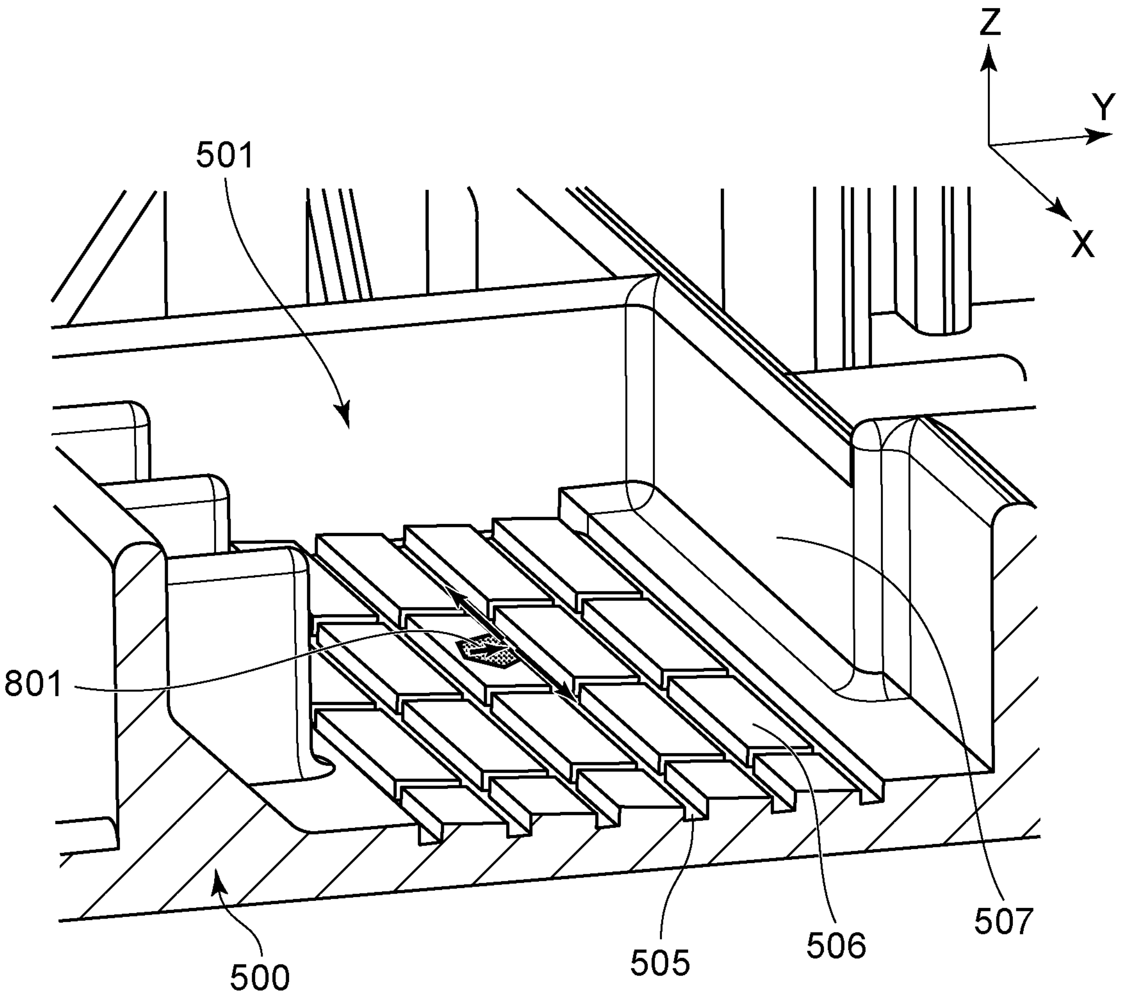
FIG. 12 is a perspective view of a first modification of the protrusions of the ink receptacle.
Figure 13:
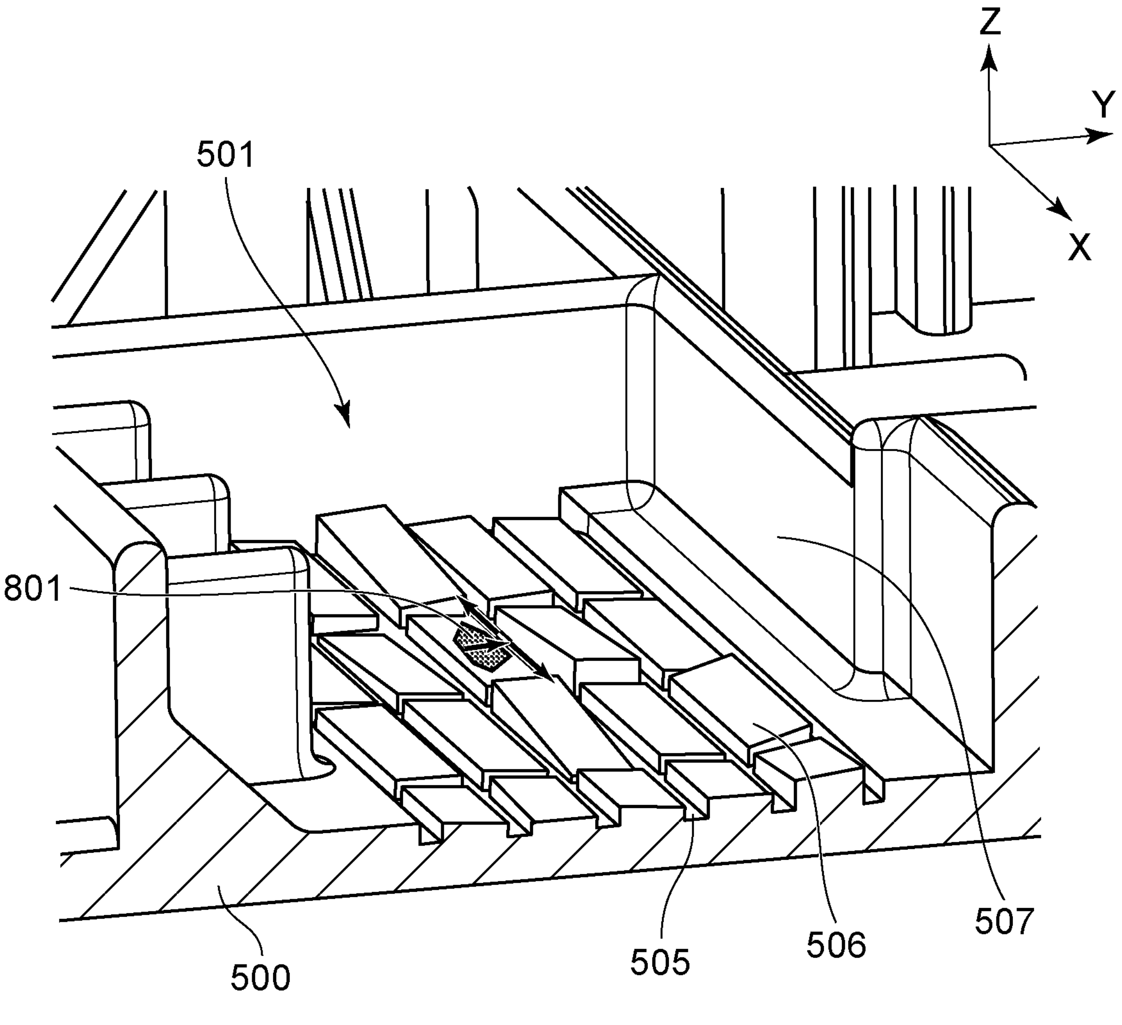
FIG. 13 is a perspective view of a second modification of the protrusions of the ink receptacle.
Figure 14:
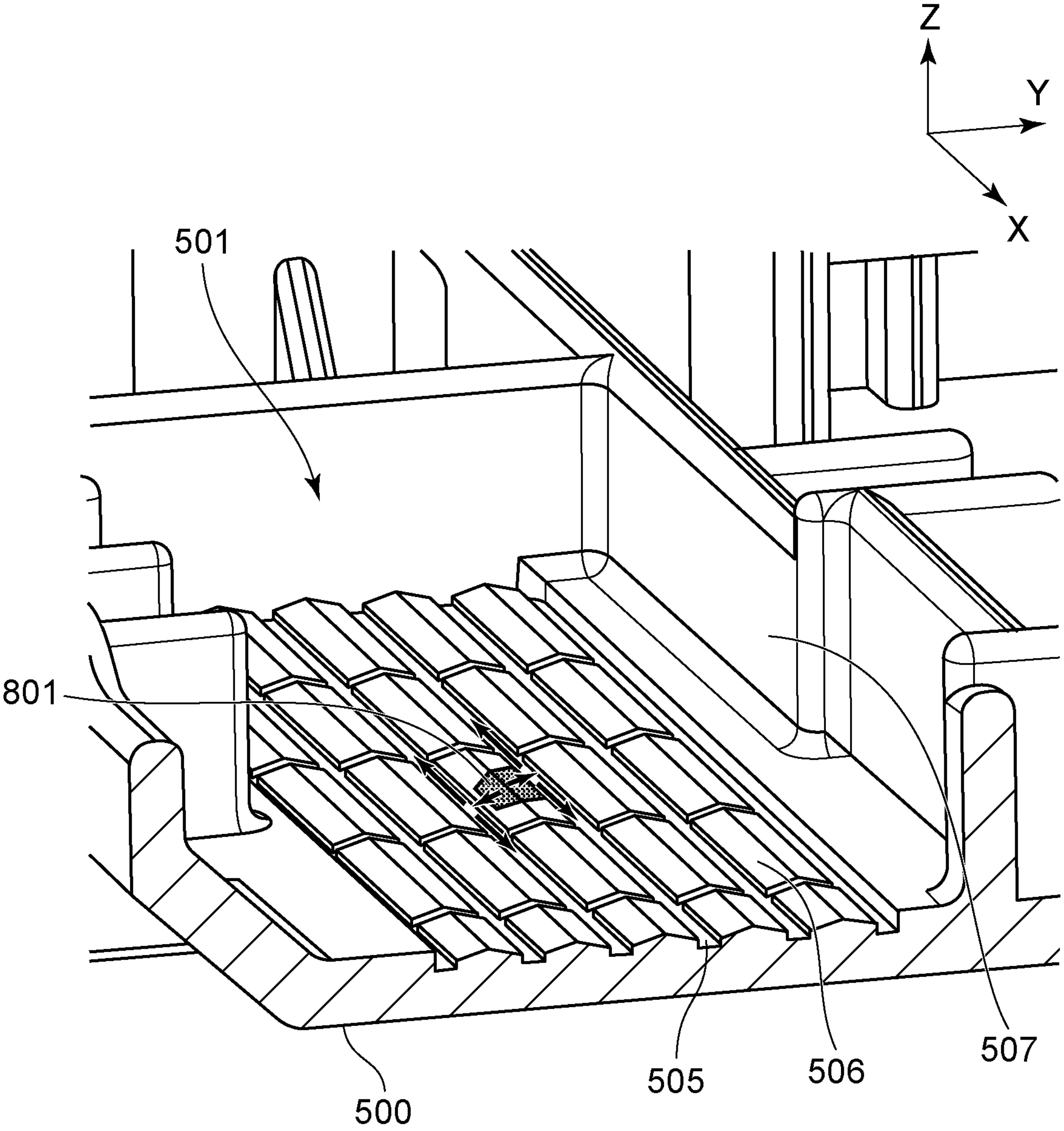
FIG. 14 is a perspective view of a third modification of the protrusions of the ink receptacle.

FIGS. 12 to 14 are perspective views of modifications of the protrusions 506 of the ink receptacle 501. FIGS. 12 to 14 are a first modification, a second modification, and a third modification, respectively. Although the protrusions 506 in the first embodiment are configured such that the inclinations of the upper surfaces of adjacent protrusions 506 are alternately oriented, the inclinations of the upper surfaces of all the protrusions 506 may be oriented in the same direction as in FIG. 12 (the first modification). In this case, the angles of the inclinations may be the same or different for each of the protrusions 506. Alternatively, the orientations and angles of the inclinations may be at random as in FIG. 13 (the second modification), or the upper surfaces of the protrusions 506 may be inclined in a chevron shape as in FIG. 14 (the third modification). In the first modification, the ink droplet 801 moves in the direction of the inclination as indicated by the arrow in FIG. 12. Even when the ink droplet 801 drops onto the upper surface of any protrusion 506, the ink droplet 801 moves in the same manner. In the second modification, the direction in which the ink droplet 801 moves differs according to the orientation of the inclination of the protrusion 506 on which the ink droplet 801 has dropped. For example, when the ink droplet 801 drops on the position shown in FIG. 13, the ink droplet 801 moves in the direction of the arrow. In the third modification, the waste ink that has dropped onto the upper surface of the protrusion 506 is guided in front and back in the Y direction as indicated by the arrows in FIG. 14 and is diffused by the grooves 505. The upper surfaces of the protrusions 506 do not need to be flat, but may be curved upward or may be inclined in combination of a flat surface and a curved surface.

Even the shapes of the protrusions 506 as in FIGS. 12 to 14 allow the ink droplet 801 that has dropped onto the upper surfaces of the protrusions 506 to be guided to the grooves 505 and diffused, thereby eliminating or minimizing splashing and leakage of the waste ink as in the first embodiment. Furthermore, a configuration in which the upper surfaces of the protrusions 506 are flat without inclination is also applicable. In the case where the upper surfaces of the protrusions 506 are not inclined, decreasing the areas of the upper surfaces of the protrusions 506 makes the waste ink unlikely to stay on the upper surfaces of the protrusions 506, thereby allowing the waste ink to be immediately moved to the grooves 505. The areas of the upper surfaces of the protrusions 506 can be decreased by, for example, increasing the number of grooves 505 or the interval between adjacent grooves 505.

Figure 15:
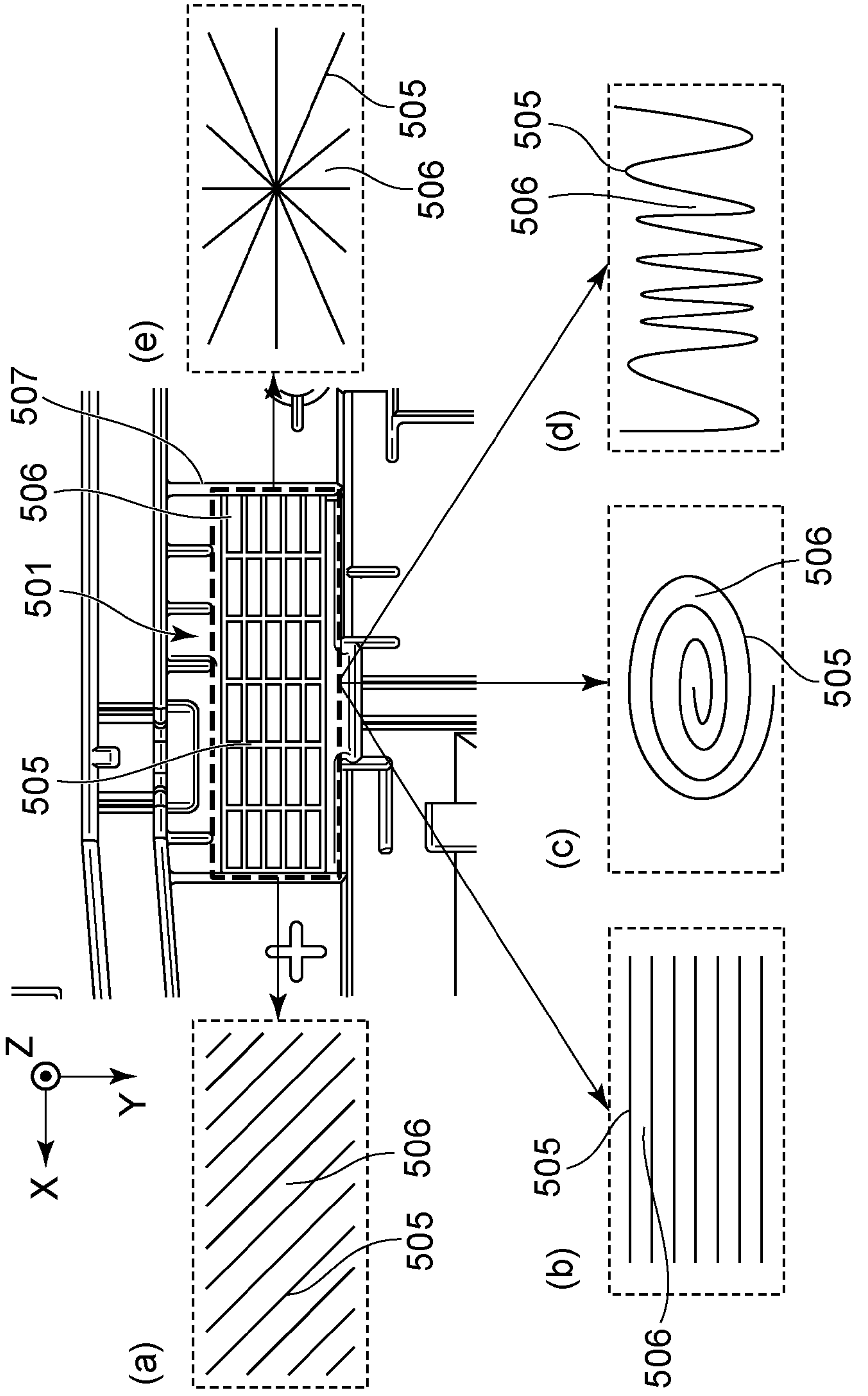
FIG. 15 is a schematic diagram illustrating modifications of the grooves of the ink receptacle.

FIG. 15 is a schematic diagram illustrating modifications of the grooves 505. In the first embodiment, the grooves 505 are formed in a grid shape in an X-Y plane. However, the shape of the grooves 505 is not limited to the grid shape. For example, the grooves 505 may be arranged parallel to each other, and the grooves 505 and the protrusions 506 are alternately arranged as in (a) and (b) of FIG. 15. Alternatively, the groove 505 may be formed in a spiral, as in (c) of FIG. 15. Alternatively, the groove 505 may be formed in a wave form as in (d) of FIG. 15 or in a radial pattern as in (e) of FIG. 15. Even with the grooves 505 in any of the above shapes, the waste ink can be immediately guided to the grooves 505 and diffused and retained by inclining the upper surfaces of the protrusions 506 adjacent to the grooves 505.

Figure 16:
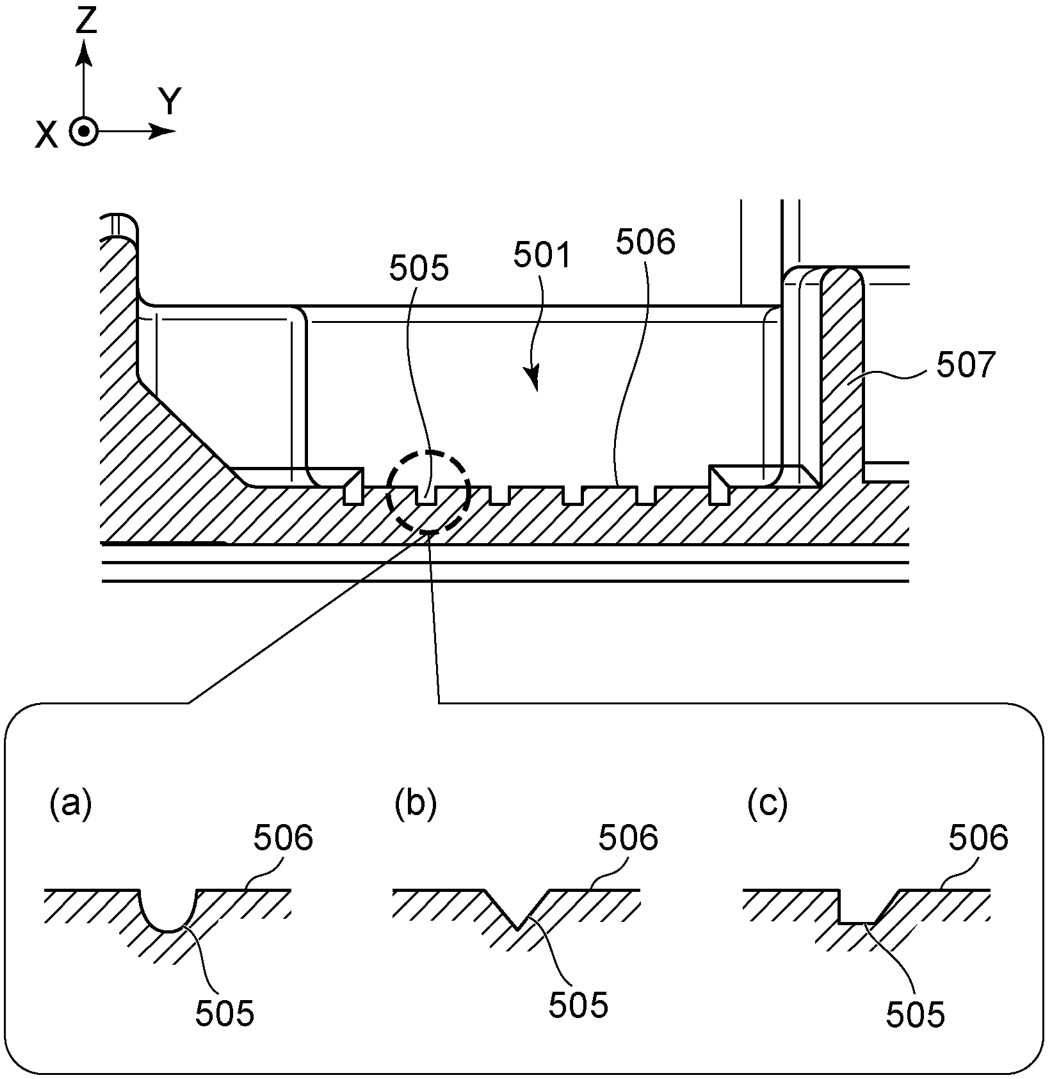
FIG. 16 is a schematic diagram illustrating modifications of the cross-sectional shape of the grooves of the ink receptacle.

FIG. 16 is a schematic diagram illustrating modifications of the cross-sectional shape of the grooves 505. The groove 505 of the first embodiment is rectangular in Y-Z cross section, but may be curved in a downward convex shape in Y-Z cross section as shown in (a) of FIG. 15. The groove 505 may be in V-shape in cross section as in (b) of FIG. 15 or left-right asymmetrical shape in the Y direction in cross section as in (c) of FIG. 15. If the grooves 505 extend in the Y direction (not shown), the X-Z cross section of the grooves 505 may be modified as described above. The cross-sectional shape of the groove 505 may be changed to another shape at an intermediate point in the longitudinal direction (in the X direction in (a) to (e) of FIG. 15. Changing the cross-sectional shape of the groove 505 at an intermediate point in the longitudinal direction allows the capillary force of the groove 505 to be changed in magnitude, improving the diffusibility of the waste ink.

The modifications of the grooves 505 described with reference to FIGS. 15 and 16 are also applicable to the grooves 605 in the holder member 600.

Figure 17:
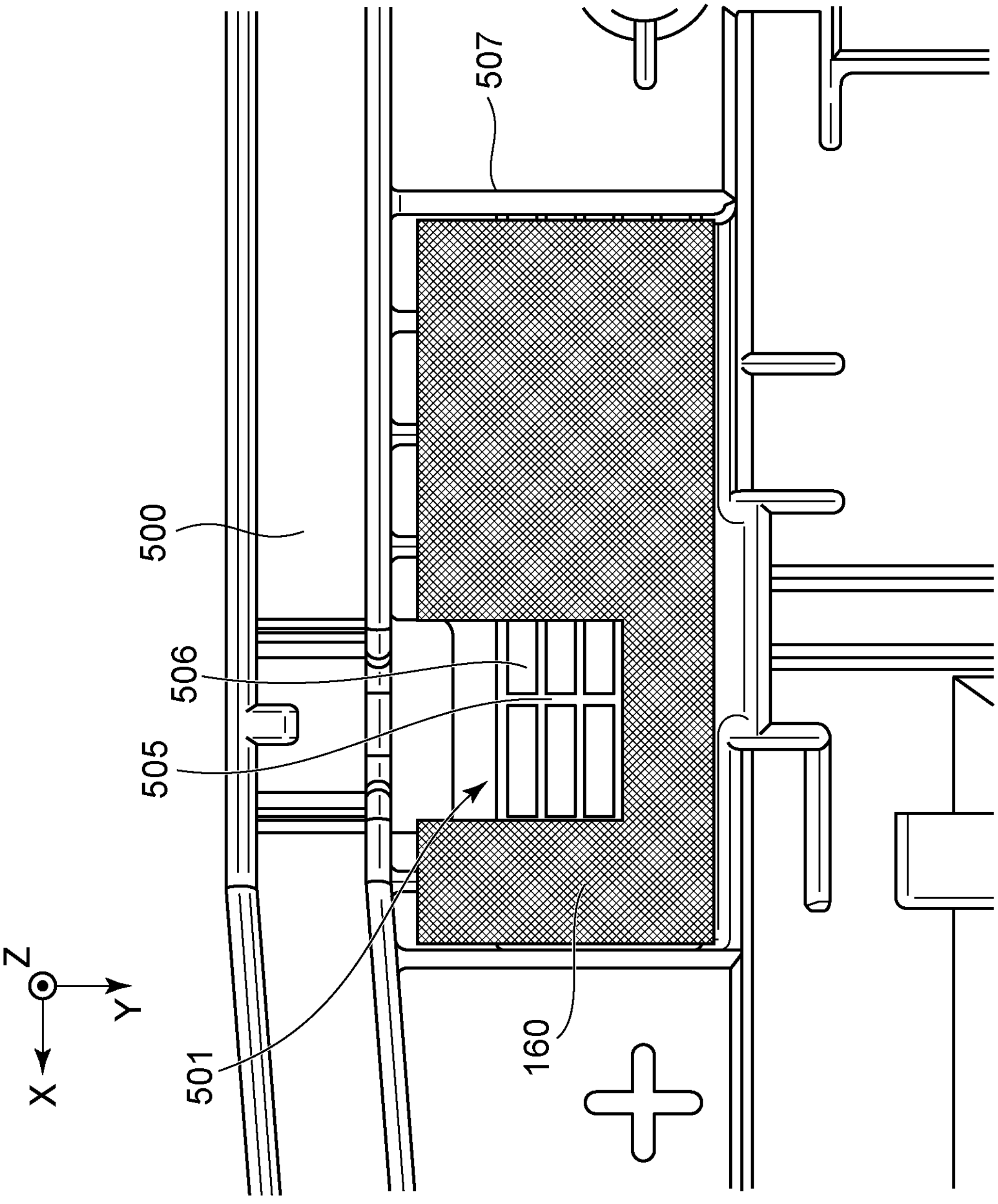
FIG. 17 is a top view of a modification of the configuration of the ink receptacle.

FIG. 17 is a top view of a modification of the configuration of the ink receptacle 501. In this modification, an absorbing member 160 is disposed in the ink receptacle 501. Applicable examples of the absorbing member 160 include members with a structure capable of absorbing and retaining liquid, such as a felt-like material and a porous material. In the first embodiment, waste ink that has exceeded the capacity of the grooves 505 is retained in the ink receptacle 501 with the wall 507. However, disposing the absorbing member 160 in the ink receptacle 501 allows the waste ink to be absorbed and retained in the absorbing member 160. This can eliminate or minimize splashing and leakage of waste ink more reliably. Immediately below the needles 950 in the Z direction, the absorbing member 160 is not present, and the grooves 505 and the protrusions 506 are exposed. This offers both the advantageous effect of efficiently diffusing the waste ink that has dropped from the needles 950 using the protrusions 506 and the grooves 505 to promote evaporation and the advantageous effect of retaining the waste ink with the absorbing member 160.

Although the first embodiment and the other embodiments have multiple grooves 505 and grooves 605, only one groove 505 and one groove 605 may be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-169424, filed Oct. 21, 2022, which is hereby incorporated by reference herein in its entirety.

What is claimed is:

1. A liquid ejecting apparatus comprising:
- a liquid ejection head configured to eject liquid;
- a recovery unit configured to maintain liquid ejecting performance of the liquid ejection head;
- a housing configured to house a container that is configured to accommodate liquid received by the recovery unit;
- a discharge unit configured to discharge the liquid received by the recovery unit to the container;
- a casing including the discharge unit and the housing; and
- a liquid receptacle disposed below the discharge unit in a direction of gravity in the casing and including a plurality of grooves intersecting in a plane crossing the direction of gravity to form a grid pattern,
- wherein the liquid receptacle comprises a plurality of protrusions adjacent to the grooves, part of an upper surface of each protrusion being included toward an adjacent groove, and
- wherein orientations of inclinations of the upper surfaces of the protrusions differ.

2. The liquid ejecting apparatus according to claim 1,
- wherein the liquid receptacle includes a protrusion and another protrusion adjacent thereto, and
- wherein part of an upper surface of the protrusion is inclined in a first orientation and part of an upper surface of the another protrusion is inclined in a second orientation different from the first orientation.

3. The liquid ejecting apparatus according to claim 1, wherein the liquid receptacle includes a protrusion and another protrusion adjacent thereto, and wherein part of upper surfaces of both the protrusion and the another protrusion are inclined in the same orientation.

4. The liquid ejecting apparatus according to claim 1, wherein the liquid receptacle includes a wall disposed around the plurality of grooves and having a height upward in the direction of gravity.

5. The liquid ejecting apparatus according to claim 1, wherein one of the plurality of grooves includes a rectangular portion in cross sectional shape.

6. The liquid ejecting apparatus according to claim 1, wherein one of the plurality of grooves includes a curved portion that is convex downward in cross sectional shape.

7. The liquid ejecting apparatus according to claim 1, wherein one of the plurality of grooves includes a V-shaped portion in cross sectional shape.

8. The liquid ejecting apparatus according to claim 1, wherein the discharge unit is disposed on a side of the housing that has a third groove connecting the discharge unit and the liquid receptacle together.

9. The liquid ejecting apparatus according to claim 1, wherein the liquid receptacle includes an absorbing member configured to absorb liquid.

10. The liquid ejecting apparatus according to claim 9, wherein the absorbing member is disposed, in the liquid receptacle, away from positions of part of the plurality of grooves.

11. The liquid ejecting apparatus according to claim 1, wherein orientations of inclination of the upper surfaces of adjacent protrusions alternate.

* * * * *